(12) United States Patent
Liang et al.

(10) Patent No.: US 11,678,684 B2
(45) Date of Patent: Jun. 20, 2023

(54) PREPARATION METHOD OF EEL POLYPEPTIDE FLAVOR EXTRACT, EEL POLYPEPTIDE FLAVOR EXTRACT AND EEL SAUCE

(71) Applicant: WUYI UNIVERSITY, Guangdong (CN)

(72) Inventors: Yaoshun Liang, Guangdong (CN); Minchao Liu, Guangdong (CN); Chen Li, Guangdong (CN)

(73) Assignee: Wuyi University, Jiangmen (CN)

( * ) Notice: Subject to any disclaimer, the term of this patent is extended or adjusted under 35 U.S.C. 154(b) by 218 days.

(21) Appl. No.: 16/910,725

(22) Filed: Jun. 24, 2020

(65) Prior Publication Data
US 2021/0282437 A1 Sep. 16, 2021

(30) Foreign Application Priority Data
Mar. 13, 2020 (CN) .......................... 202010174920.0

(51) Int. Cl.
| | |
|---|---|
| *A23L 17/20* | (2016.01) |
| *A23L 17/00* | (2016.01) |
| *A23L 29/00* | (2016.01) |
| *A23L 27/40* | (2016.01) |
| *A23L 29/30* | (2016.01) |
| *A23L 5/40* | (2016.01) |
| *A23L 27/21* | (2016.01) |
| *A23L 23/00* | (2016.01) |
| *A23L 27/10* | (2016.01) |
| *A23L 27/50* | (2016.01) |
| *A23L 31/15* | (2016.01) |

(52) U.S. Cl.
CPC ................ *A23L 17/20* (2016.08); *A23L 5/40* (2016.08); *A23L 17/65* (2016.08); *A23L 23/00* (2016.08); *A23L 27/10* (2016.08); *A23L 27/215* (2016.08); *A23L 27/40* (2016.08); *A23L 27/50* (2016.08); *A23L 29/035* (2016.08); *A23L 29/35* (2016.08); *A23L 31/15* (2016.08); *A23V 2002/00* (2013.01)

(58) Field of Classification Search
CPC .......... A23L 17/20; A23L 17/65; A23L 27/40; A23L 29/35; A23L 5/40; A23L 27/215; A23L 27/10; A23L 27/50; A23L 31/15; A23V 2002/00
USPC ......................................................... 426/60
See application file for complete search history.

(56) References Cited

U.S. PATENT DOCUMENTS

2017/0099865 A1* 4/2017 Zhang ..................... A23L 27/50

OTHER PUBLICATIONS

CN-105707821—English Abstract (Year: 2016).*
Fujimaki et al. Agric. Biolog. Chem. 37: 2891-2898 (Abstract) (Year: 1973).*

* cited by examiner

*Primary Examiner* — Hamid R Badr

(57) ABSTRACT

The disclosure relates to a preparation method of eel polypeptide flavor extract, the eel polypeptide flavor extract, and the eel sauce. The preparation method of the eel polypeptide flavor extract includes the following steps: obtained by using eel processing by-products, eel cutting off the main meat tissues, successively performing microbial fermentation, Maillard reaction and extraction and separation processes. The eel polypeptide extract obtained above is used to making a condiment eel sauce. The eel sauce is nutritious and convenient, it can be used directly for table eating or served as cooking condiments to enhance the aroma and taste of dishes and increase the attractiveness of dishes. The disclosure realizes a new technological research on the preparation of polypeptide and flavor products, opens up a scientific utilization and processing method of seafood processing by-products, and provides a new way for making full use of such resources.

3 Claims, No Drawings

PREPARATION METHOD OF EEL POLYPEPTIDE FLAVOR EXTRACT, EEL POLYPEPTIDE FLAVOR EXTRACT AND EEL SAUCE

CROSS REFERENCE TO RELATED APPLICATIONS

This application is based on and claims the benefit of priority from Chinese Patent Application No. 202010174920.0, filed on 13 Mar. 2020, the entirety of which is incorporated by reference herein.

BACKGROUND OF THE INVENTION

Field of the Invention

The present disclosure relates to the field of food science and food processing, in particular, relates to a preparation method of eel polypeptide flavor extract, the eel polypeptide flavor extract, and the eel sauce.

Description of the Related Art

Eels, also known as white eels and Japanese eels, mainly grow in the waters of tropical and temperate regions. Eels have varieties of abundant nutrients, are rich in high-quality proteins and various essential amino acids, vitamin A, vitamin E, phospholipid, DHA, EPA, calcium, and zinc, etc. They are natural and healthy food materials.

Generally, only eel meat is cooked into various dishes, and the resulting large amount of processing by-products, that is, scraps, such as fish head, fish tail, fish belly, fish fin and fish bone, are not fully utilized. These processing by-products are rich in protein, phospholipid, chondroitin, vitamins, minerals, taurine and other nutrients.

Although at present, condiments made of eel are available in the market, these eel condiments with high production cost are relatively simple in flavor. It is difficult to meet the market needs and the increasing taste desires of consumers.

BRIEF SUMMARY OF THE INVENTION

The present disclosure aims to solve at least one of the problems existing in the prior art. Therefore, the disclosure provides a preparation method of eel polypeptide flavor extract, the eel polypeptide flavor extract and the eel sauce. This method can produce a kind of eel polypeptide flavor extract with strong aroma, outstanding delicate flavor, sweet and palatable taste and rich unique eel flavor at low cost, the polypeptide flavor extract can further be used to produce the related eel sauce according to market needs.

In one aspect of the present disclosure, providing a preparation method of eel polypeptide flavor extract includes the following steps: taking eel processing by-products as raw materials, the eel polypeptide flavor extract is prepared by successively performing microbial fermentation, Maillard reaction and extraction and separation process.

According to one embodiment of the disclosure, the preparation method of eel polypeptide flavor extract has the following beneficial effects at least:

The preparation method uses eel processing by-products as raw materials, makes full utilization of the waste materials from the eel cooking process, and reduces production cost while achieving the purpose of environmental protection.

The eel processing by-products decompose into polypeptides and amino acids through microbial fermentation, then a strong aroma is generated, and the color of hydrolysate is improved in the process of Maillard reaction. Finally, the eel polypeptide flavor extract rich in flavor peptides and various amino acids can be obtained.

The preparation method of the present disclosure is simple in operation, controllable in reaction and economical in raw materials price, which initiate a scientific utilization and processing method of seafood processing by-products and provides a new approach for the full utilization of the resources.

According to some embodiments of the present disclosure, the eel processing by-products include one or more of the fish head, fish tail, fish brisket, fish fin and fish flesh.

The above-mentioned eel processing by-products are the processing by-products obtained by cutting off the main meat tissues of eel, such as the waste materials like fish head, fish tail, fish belly, fish fin, and fish bone, etc. Fish meat can also be used as a preparing raw material. In order to reduce the production cost and make full use of eel resources, the preparation method of the embodiment of the present disclosure mainly takes the waste materials generated after cutting off the eel meat as processing by-products.

According to some embodiments of the present disclosure, the microbial fermentation includes the following steps:

S1. after the raw materials were sterilized, *Mucor* strains were inoculated and cultured at a constant temperature of 23-28° C. for 40-48 hours to obtain the *Mucor* eel embryo;

S2. adding materials with a mass ratio as: the *Mucor* eel embryo:salt water:rice wine=1:(0.55-0.75):(0.35-0.55) for sealed fermentation, after fermentation, the fermentation liquid is obtained by squeezing; the concentration of the rice wine is 20~40 vol/100 mL, and the concentration of the salt water is 16~20 Baume.

In the above-mentioned step S1, the raw materials need to be washed, drained, and sterilized before inoculation. The sterilization method is steam heating, at 0.1 MPa, for 4 min.

In the above-mentioned step S1, *Mucor*, a microbial strain, is used for fermentation. *Mucor* secretes abundant proteases during the growth process, and these proteases discompose proteins to polypeptides and amino acids during the fermentation process. Compared with traditional methods by adding a simple protease for hydrolysis, this method can save the production cost of purchasing protease. Meanwhile, the enzymes secreted by *Mucor* is more abundant, the decomposition products are more diversified, making the eel flavor polypeptide hydrolysate taste mellow and richer.

In the above-mentioned step S2, the rice wine and salt are added in the fermentation process to inhibit the growth of bacteria, meanwhile, the addition of rice wine can reduce the use amount of salt to decrease the salinity. At the same time, the ethanol in the wine can react with amino acids or other organic acids to form esters, making the fermentation products are of more richer ester flavor.

According to some embodiments of the present disclosure, in the step S1, the method of inoculating the *Mucor* strains is as follows: evenly spray *Mucor* spore liquid on the raw materials, and the dosage of the *Mucor* spore liquid is 0.3 wt % of the weight of the raw materials.

The preparation method of the *Mucor* spore liquid is as follows: taking one equivalent of *Mucor* triangular flask seeds, adding 20 weight equivalents of sterile water, stir well then filter through two layers of gauze, collect filtrate to obtain the *Mucor* spore liquid. The characteristic of the *Mucor* eel embryo is that the eel surface is full of *Mucor* with a length of more than 1cm, until the *Mucor* just begins to grow yellowish spores, and the *Mucor* eel embryo is made.

According to some embodiments of the present disclosure, the preferable mass ratio in step S2 is the *Mucor* eel embryo:saltwater:rice wine=1:0.7:0.5.

The preferable concentration of rice wine is 30 vol/100 ml, and the preferable concentration of saltwater is 18 Baume.

The sealed fermentation method is that fermentation at room temperature for 1 month. Stir every 5 days during fermentation.

According to some embodiments of the present disclosure, the Maillard reaction includes the following steps: adding 8%~12% white sugar to the fermentation liquid obtained from the raw materials after microbial fermentation, and reacting at 110~130° C. for 60-90 min.

The Maillard reaction is carried out at 110~130° C., the appropriate reaction temperature and time are helpful to produce a strong aroma and to improve the color of hydrolysate, while killing the harmful bacteria in the eel polypeptide flavor extract.

According to some embodiments of the present disclosure, the extraction and separation process includes the following steps: separating the products, the raw materials after Maillard reaction, to obtain the eel polypeptide flavor extract with molecular weight less than 100 kDa.

The separation method is as follows: the products after Maillard reaction are separated by centrifugation and filtered by polysulfone membrane. The filtered solution is relatively clear with less precipitation.

The second aspect of embodiment according to the present disclosure relate to eel polypeptide flavor extract, which is prepared by the above-mentioned method.

The eel polypeptide flavor extract according to an embodiment of another aspect of the present disclosure has at least the following beneficial effects:

the eel polypeptide flavor extract from the embodiments of the present disclosure has characteristics of strong aromarich fragrance, outstanding delicate flavor, sweet and palatable taste and rich unique eel flavor. It can be conveniently applied to all kinds of food or used directly for table eating, and it further has a wide industrial application potentials and broad market prospect.

The eel sauce according to an embodiment of yet another aspect of the present disclosure is with preparing raw materials includes the above-mentioned eel polypeptide flavor extract.

The eel sauce according to an embodiment of yet another aspect of the present disclosure, has the following beneficial effects at least:

the eel sauce, by adding the homemade eel polypeptide flavor extract and at the same time by spice blends with technology and comprehensive processing technology, developed with special flavor spices, the product has characteristics of natural flavor, taste mellow, strong stretching feels and natural, etc., improving the quality of condiments.

According to an embodiment of yet another aspect of the present disclosure, the raw materials of the eel sauce further includes white sugar, soy sauce, mirin, salt, fructose syrup, maltose, yeast extract, caramel color, denatured starch, lactic acid and water.

According to an embodiment of yet another aspect of the present disclosure, the eel sauce includes the following components by mass percentage:

the eel polypeptide flavor extraction fluid: 20-30%;
white sugar: 15-20%;
soy sauce: 10-20%;
mirin: 10~15%;
salt: 2~5%;
fructose syrup: 5-10%;
maltose: 3-8%;
yeast extract: 1~5%;
caramel color: 0.5~1.5%;
denatured starch 0.3-0.1%;
lactic acid: 0.1~0.5%;
the water margin.

The preparation method of the eel sauce above-mentioned includes the following steps: the eel polypeptide flavor extract, soy sauce, denatured starch, caramel color, fructose syrup, white sugar, salt, maltose, yeast extract and water are mixed, heated, stirred well at 95~105° C. for 8~12 min, kept warm to 98° C. after the flavorings and lactic acid are added, and obtained by filtering with 1 mm sieve.

Additional features and advantages of the present disclosure will be set forth in the following description, and in part will be apparent from the description below, or may be learned by practice of the disclosure.

DETAILED DESCRIPTION OF THE INVENTION

In order to explain the technical solution, the purpose and the effect of the disclosure in detail, the following description will be made with reference to the embodiments.

Example 1

This example provides a preparation method of eel polypeptide flavor extract, which is taking eel processing by-products as raw materials, prepared by successively performing microbial fermentation, Maillard reaction and extraction and separation process. Wherein the eel processing by-products include one or more of fish head, fish tail, fish belly, fish fin and fish meat.

Example 2

This example provides a preparation method of eel polypeptide extract flavor, which is taking eel processing by-products as raw materials, prepared by successively performing microbial fermentation, Maillard reaction and extraction and separation process, including the following steps:

1. Microbial Fermentation:

S1, after the raw materials were sterilized, *Mucor* strains were inoculated and cultured at a constant temperature of 23-28° C. for 40-48 hours to obtain the *Mucor* eel embryo;

S2, adding materials with a mass ratio as: the *Mucor* eel embryo:salt water:rice wine=1:(0.55-0.75):(0.35-0.55) for sealed fermentation, after fermentation, the fermentation liquid is obtained by squeezing; the concentration of the rice wine is 20~40 vol/100 mL, and the concentration of the salt water is 16~20 Baume.

Prior to step S1, the raw eel processing by-products were washed with clean water and drained.

In step S1, the sterilization method is steam heating sterilization at 0.1 MPa for 4 min.

For inoculation of *Mucor* strains, the eel processing by-products were cooled to below 36° C. before the inoculation of *Mucor* strains. Inoculation method: spray *Mucor* spore liquid with a spray pot, the amount of *Mucor* spore liquid is 0.3 wt % of the raw materials mass. The preparation method of *Mucor* spore liquid is as follows: taking one equivalent of *Mucor* triangular flask seeds, adding 20 weight equivalents of sterile water, stir well, then filter through two layers of gauze, collect filtrate to obtain the *Mucor* spore liquid.

After inoculation with *Mucor*, the eel was incubated for 40~48 hours at a constant temperature of 23~28° C. The terminus of incubation is when the eel surface is full of *Mucor* with a length of more than 1cm, and the *Mucor* just begins to grow yellowish spores, and the *Mucor* eel embryo is made.

In step S2, adding materials with a mass ratio as: the *Mucor* eel embryo:saltwater:rice wine=1:(0.55-0.75):(0.35-0.55) for sealed fermentation. Preferably, the proportion of the *Mucor* eel embryo:saltwater:rice wine=1:0.7:0.5; rice wine concentration is 30 vol/100 ml, and the degree of saltwater is 18 Baume. The fermentation temperature is normal, the fermentation cycle is 1 month, and the fermentation period is stirred every 5 days.

2. Maillard Reaction:

the following steps are included: adding 8%~12% white granulated sugar into the fermentation liquid obtained from the raw materials after microbial fermentation, and reacting at 110~130° C. for 60~90 min. It is preferable to add 10% white granulated sugar, and the reaction steam pressure is 0.1 MPa, at 120° C. for 75 min.

3. Extraction and Separation:

The following steps are included: the extraction solution after the above-mentioned Maillard reaction is separated by centrifugation and then filtered by polysulfone membrane to obtain the eel polypeptide flavor extract with molecular weight less than 100 kDa.

Example 3

This example provides a (original) eel sauce containing the eel polypeptide flavor extract prepared by the method of Example 2, as well as containing white sugar, soy sauce, mirin, salt, fructose syrup, maltose, yeast extract, caramel color, denatured starch, lactic acid and water. The specific ratio is:

the eel polypeptide flavor extraction liquid: 20~30 parts; white sugar: 15~20 parts; soy sauce: 10-20 parts; mirin: 10~15 parts; salt: 2-5 parts; fructose syrup: 5-10 parts; maltose: 3~8 parts; yeast extract: 1~5 parts; caramel color: 0.5~1.5 parts; denatured starch 0.3~0.1 parts; lactic acid: 0.1~0.5 parts; water margin.

The preparation method of eel sauce is as follows:

(1) Preparation of denatured starch slurry: the denatured starch is separated with some water of the formula, stirred evenly, and set aside;

(2) Preparation of caramel color paste: the caramel color is fully mixed with some soy sauce of the formula, stirred evenly, and set aside;

(3) the eel polypeptide flavor extract, soy sauce, denatured starch paste, caramel color paste, high fructose corn syrup, sugar and water were added into the boiling pot and stirred evenly;

(4) heat the boiling pot to 100° C. and keep stirring for 8 minutes;

(5) add the mirin and lactic acid solution into the boiling pot and raise the temperature to 98° C.;

(6) after inspection, filtering with the 1 mm sieve, filling, to produce delicious eel sauce as finished products.

Example 4

In this example, the eel polypeptide flavor extract was prepared according to the method of Example 2.

Prior to step S1, the raw eel processing by-products were washed with clean water and drained.

In step S1, the sterilization method is steam heating sterilization at 0.1 MPa for 4 min. For inoculation of *Mucor* strains, the raw eel processing by-products were cooled to below 36° C. before the inoculation of *Mucor* strains. Inoculation method: spray *Mucor* spore liquid with a spray pot, the amount of *Mucor* spore liquid is 0.3 wt % of the raw materials mass. The preparation method of the *Mucor* spore liquid is as follows: taking one equivalent of *Mucor* triangular flask seeds, adding 20 weight equivalents of sterile water, stir well then filter through two layers of gauze, collect filtrate to obtain the *Mucor* spore liquid. After inoculation with *Mucor* strains, the eel was incubated for 40 h at a constant temperature of 25° C. The terminus of incubation is when the eel surface is full of *Mucor* with a length of more than 1 cm, and the *Mucor* just begins to grow yellowish spores, and the *Mucor* eel embryo is made.

In step S2, adding materials with a mass ratio as: the *Mucor* eel embryo:saltwater:rice wine 1:0.7:0.5 for sealed fermentation. Preferably, the concentration of rice wine is 30 vol/100 ml, and the degree of saltwater is 18 Baume. The fermentation temperature is room temperature, the fermentation cycle is 1 month, and the fermentation period is stirred every 5 days.

In Maillard reaction, adding 10% white granulated sugar into the fermentation liquid obtained from the raw materials after microbial fermentation, and reacting at 120° C. for 75 min. The extract after Maillard reaction was separated by centrifugation and filtered by polysulfone membrane to obtain the eel polypeptide flavor extract with molecular weight less than 100 kDa.

Example 5

In this example, the (original) eel sauce was prepared according to the method of Example 3, the specific ratio is:

The eel polypeptide flavor extraction liquid: 25%; white sugar: 15%; soy sauce: 10%; mirin: 10%; salt: 2%; fructose syrup: 5%; maltose: 3%; yeast extract: 1%; caramel color: 0.5%; denatured starch 0.3%; lactic acid: 0.1%; the water margin.

Comparative Example 1

In this example, the eel polypeptide flavor extract was prepared according to the method of Example 2. The difference between this example and Example 4 is in step S1 of microbial fermentation stage, after the raw material is sterilized, no *Mucor* strains were inoculated, 1% the neutral protease hydrolysate (from *Bacillus subtilis*) is directly added to the raw materials, performing hydrolysis to raw materials to get eel fish protein hydrolysate, then through the same Maillard reaction and extraction and separation technology as the Example 4 to obtain the eel polypeptide flavor extract.

Comparative Example 2

In this example, the eel polypeptide flavor extract was prepared according to the method of Example 2. The difference between this example and Example 4 is in step S1 of the microbial fermentation stage, after the raw material is sterilized, *Aspergillus oryzae* 3042 bacteria is inoculated to replace *Mucor*. The culture condition is, culture at a constant temperature of 32 for 40 hours. The remaining steps and technological conditions are the same as those in Example 4.

Comparative Example 3

In this example, the eel polypeptide flavor extract was prepared according to the method of Example 2. The difference between this example and Example 4 is in step S2 of the microbial fermentation stage, rice wine is not added, and sealed fermentation is conducted according to the mass ratio of the *Mucor* eel embryo:saltwater=1:1.2. The remaining steps and technological conditions are the same as those in Example 4.

Comparative Example 4

In this example, the eel polypeptide flavor extract was prepared according to the method of Example 2. The difference between this example and Example 4 is in step S2 of the microbial fermentation stage, no saltwater is added, and sealed fermentation is conducted according to the mass ratio of the *Mucor* eel embryo:rice wine=1:1.2. The remaining steps and technological conditions are the same as those in Example 4.

Test Example

Product Evaluation Analysis
1. Sensory and Physicochemical Analysis of Eel Polypeptide Flavor Extract Sensory evaluation and physical and chemical analysis were carried out for the products in Example 4 and Comparative Examples 1-4. Sensory evaluation includes the evaluation of color, aroma, taste and shape of the extract, and the physical and chemical indexes were used to determine the amino acid nitrogen (AAN), total acid (TA), soluble saltless solids and total nitrogen. The results were shown in table 1.

For the products of Comparative Example 2, since in step S1 of the microbial fermentation stage, *Aspergillus oryzae* 3042 was inoculated to replace *Mucor* after the sterilization of the raw materials. Due to the influence of green spores of *Aspergillus oryzae* 3042, the color of the products became dark, and the fermentation products contained relatively more bitter peptides, making the products slightly bitter.

For the products of Comparative Example 3, since in step S2 of the microbial fermentation stage, there was no rice wine added, and adding materials according to the mass ratio of *Mucor* eel:saltwater=1:1 for the sealed fermentation. Due to the relatively high salt content, the activity of hydrolase secreted by *Mucor* was inhibited, the decomposition utilization rate of the raw materials is low, the product amino acid content is low, and the lack of alcohol was participated in the esterification reaction, so that esters content in the products was low and the ester flavor of the product is less.

For the product of Comparative Example 4, since in step S2 of the microbial fermentation stage, there was no saltwater added, and adding materials according to the mass ratio of the *Mucor* eel embryo:rice wine=1:1.2 for the sealed fermentation. Due to the relatively high alcohol content, the wine taste is strong, at the same time the astringent taste brought by the wine can be obviously tasted, and some wine under the effect of microbial is oxidized to acid, increasing acidity, without the participation of salty taste, the umami taste is not prominent, and the taste is dissonance.

TABLE 1 results of sensory evaluation and physical and chemical analysis

| Sample | Color | Aroma | Taste | Shapes | Soluble Saltless Solid g/100 mL | Total Nitrogen g/100 mL | Amino Acid Nitrogen g/100 mL | Total Acid g/100 mL |
|---|---|---|---|---|---|---|---|---|
| Example 4 | Yellowish brown, bright vivid | Strong ester aroma with a delicate aroma of eel | Salty sweet taste right, umami, strong taste | Uniform, flowable, thick | 19.2 | 1.34 | 0.72 | 1.73 |
| Comparative Example 1 | Tan, bright | Strong hydrolytic aroma | Monotonous taste | Uniform, flowable | 15.1 | 1.28 | 0.53 | 1.33 |
| Comparative Example 2 | Dark brown | Fermenting aroma | Slightly bitter | Uniform, flowable, thick | 18.8 | 1.31 | 0.69 | 1.80 |
| Comparative Example 3 | Tan, shiny | Light aroma, no ester aroma | Salty and umami | Uniform, flowable | 17.8 | 1.04 | 0.50 | 1.12 |
| Comparative Example 4 | Dark tan, shiny | Wine aroma with ester aroma | Astringent and sour, no umami, taste dissonance | Uniform, flowable | 19.5 | 1.14 | 0.52 | 1.93 |

The results show that the eel polypeptide flavor extract prepared by Example 4 of the present disclosure is golden and bright, with dense aroma and sweet taste.

For the products of Comparative Example 1, since in step S1 of the microbial fermentation stage, as the raw materials were sterilized without inoculated with *Mucor* strains, there was just a single protease added to hydrolyze the raw materials. The enzymes were not rich enough and the decomposition products were not rich enough, resulting in monotonous taste.

The molecular weight distribution of the eel polypeptide flavor extract prepared from Example 4 was analyzed by sodium dodecyl sulfonate-polyacrylamide gel electrophoresis (SDS-PAGE), and the results showed that the molecular weight was 42% below 1000 Da, 23% between 1000 Da and 5000 Da, 13% between 5000 Da and 10000 Da, and 22% above 10000 Da. Peptides are intermediate products between amino acids and proteins. The size of molecular weight indicates the size distribution of polypeptides. In the hydrolyzed protein extract, the polypeptides that can enhance the flavor and taste of food are called flavorless polypeptides. The molecular weight of these peptides is mostly between 1000 and 5000 Da, which can make the food taste prominent, umami taste mellow and taste long. The size distribution of the molecular weight above indicates that the extract of example 4 is rich in flavoring polypeptide, which is a kind of flavoring polypeptide extract.

2. Sensory Evaluation Analysis of Eel Sauce

Sensory evaluation analysis and microorganism detection were carried out on the eel sauce prepared from Example 5.

The sensory evaluation was conducted by a group of 12 senior reviewers for color, aroma, taste and shape. The evaluation results are shown in table 2. The results of sensory evaluation show that the eel flavor liquid prepared by example 5 of the disclosure has prominent umami taste, sweet taste and strong bay leaf

TABLE 2 the results of evaluation and analysis

| Sample | Color | Aroma | Taste | Shape |
|---|---|---|---|---|
| Example 2 | Dark tan, shiny, bright, red | Strong aroma of ester, with eel aroma | Salty sweet taste, delicious taste, unique characteristics | Thick, flowing sauce |
| An eel sauce on sale | Brown, with a slight bright | Mainly soy sauce flavor, with obvious eel flavor | The taste is sweet, not soft enough, taste dissonance | A flowing sauce |

3. Microbial Detection of Eel Sauce

According to the Chinese national standard GB10133-2014 "Food Safety National Standard Aquatic Condiment", the main test items include pathogenic bacteria, total number of bacteria, coliform group. Pathogenic bacteria limit refers to the requirements of ready-to-eat condiments in "GB29921 National Food Safety Standards for Pathogenic Bacteria Limit" to judge the conformance of pathogenic bacteria index. The total number of bacteria and coliform bacteria group were tested by referring to the requirements of the microbial limit index in clause 3.4.2 of the standard of "GB10133-2014 Food Safety National Standard Aquatic Condiment" to judge the conformance of microbial index. The specific results are shown in table 3.

TABLE 3 the results of microbial detection

| Sample | Pathogenic bacteria | | | Total number of bacteria CFU/mL | Coliform group CFU/mL |
|---|---|---|---|---|---|
| | salmonella CFU/25 mL | Staphylococcus aureus CFU/mL | Vibrio parahaemolyticus MPN/mL | | |
| Example 5 | 0 | 0 | 0 | 70 | 0 |

According to the results in table 3 above, the microbial detection results show that the microbial detection results of the eel sauce in Example 5 of the disclosure totally meet the standard requirements. Therefore, the condiment production by the method of the disclosure conforms to the national health standards and food safety regulations and can be applied to industrial large-scale production.

In summary, the preparation method of the embodiment of the disclosure has the following obvious advantages:

(1) The disclosure using the microbial strain *Mucor* to conduct culture and fermentation. *Mucor* secretes abundant proteases during the growth process, and these proteases decompose proteins to generate polypeptides and amino acids during the fermentation process. Compared with traditional methods by adding a simple protease for hydrolysis, this method can save the production cost of purchasing protease. Meanwhile, the enzymes secreted by *Mucor* are more abundant, the decomposition products are more diversified, and the eel flavor polypeptide extract produced has a mellow and richer taste.

(2) In the process of fermentation, the wine is added for hydrolytic fermentation in cooperation with salts, which can not only achieve a good antibacterial effect, but also can reduce the use amount of salt to decrease the salinity. At the same time, the ethanol in the wine can react with amino acids or other organic acids to form esters, making the fermentation products with strong ester aroma.

(3) The present disclosure conducts Maillard reaction at high temperature, adopts appropriate treatment temperature and reaction time, produces rich aroma and improves the color of hydrolysate, at the same time, kills harmful bacteria in the eel polypeptide flavor extract.

(4) The products of the present disclosure, by adding the self-made eel polypeptide flavor extract, have the characteristics of natural flavor, mellow umami taste, strong sense of extension, and natural products, so as to improve the grade of condiments.

(5) The present disclosure is a new type of aquatic product fermentation process. Eel processing by-products can be made into edible food or condiments by microbial fermentation, extraction, separation, mixing, cooking and other production processes, which is conducive to industrial production.

The above is only the embodiments of the disclosure and does not thereby limit the patent scope of the disclosure. All equivalent transformations made by use of the contents of the specification of the disclosure, or directly or indirectly applied in the relevant technical field, are similarly included in the patentable protection scope of the disclosure.

What is claimed is:

1. A method of producing eel polypeptide flavor extract, wherein taking eel processing by-products as raw materials, comprising:
performing microbial fermentation on said raw materials;
performing Maillard reaction on the fermentation liquid obtained after the microbial fermentation to form a mixture; and
performing an extraction-separation process on said mixture after said Maillard reaction is completed, to obtain the eel polypeptide flavor extract;
wherein the eel processing by-products include one or more of a fish head, a fish tail, a fish belly, a fish fin, a fish bone, fish meat of eel;
wherein the performing the microbial fermentation comprises sterilizing the raw materials, and inoculating and culturing *Mucor* strains at a constant temperature of 23° C. to 28° C. for 40 to 48 hours to obtain fermented eel processing by-products;

mixing the fermented eel processing by-products, saltwater and rice wine at a mass ratio of 1:0.55-0.75:0.35-0.55, wherein the rice wine comprises 20% to 40% alcohol by volume, and the concentration of the saltwater is approximately 16 to 20 degrees Baume; and performing fermentation, and after fermentation, squeezing to obtain a fermentation liquid;

wherein the extraction-separation process comprises separating the mixture after said Maillard reaction is completed to obtain an extract comprising polypeptides with molecular weight less than 100 kDa.

2. The method of claim 1, wherein inoculating the *Mucor* strains comprises evenly spraying *Mucor* spore liquid on the raw materials, wherein a dosage of the *Mucor* spore liquid is 0.3 wt. % of the weight of the raw materials.

3. The method of claim 1, wherein the Maillard reaction comprises adding 8% to 12% white sugar to the fermentation liquid obtained from the raw materials after said microbial fermentation, and reacting at 110° C. to 130° C. for 60 to 90 min.

\* \* \* \* \*